United States Patent [19]

Horvath

[11] 4,049,545
[45] Sept. 20, 1977

[54] CHEMICAL WASTE WATER TREATMENT METHOD

[75] Inventor: Peter J. Horvath, Cottage Grove, Oreg.

[73] Assignee: Rocky Carvalho, Salem, Oreg.

[21] Appl. No.: 703,549

[22] Filed: July 8, 1976

[51] Int. Cl.² ............................................. C02B 1/20
[52] U.S. Cl. ..................................... 210/28; 210/46; 210/53
[58] Field of Search .................. 210/53, 52, 51, 45, 210/50, 59, 63 R, 46, 49, 42 R, 195, 197, 27, 201, 502, 198, 199, 202, 28, 40; 106/79

[56] References Cited

U.S. PATENT DOCUMENTS

| | | | |
|---|---|---|---|
| 2,355,564 | 8/1944 | Sebald | 210/197 |
| 3,171,804 | 3/1965 | Rice | 210/53 |
| 3,262,877 | 7/1966 | Le Compte, Jr. | 210/53 |
| 3,577,341 | 5/1971 | Keith, Jr. et al. | 210/53 |
| 3,687,646 | 8/1972 | Brent et al. | 210/63 R |
| 3,846,293 | 11/1974 | Campbell | 210/53 |

Primary Examiner—Thomas G. Wyse
Assistant Examiner—Benoit Castel
Attorney, Agent, or Firm—Chernoff & Vilhauer

[57] ABSTRACT

A method of treating domestic, commercial or industrial waste water which includes the steps of mixing the waste water with a coagulant aid so as to bring the pH of the mixture to within a range of about 9.0–10.5, and thereafter adding precipitating agents in at least two successive steps so as to lower the pH of the mixture by about one unit for each step and thereby precipitate solids therefrom until the mixture is approximately neutral. After the addition of each precipitating agent, the precipitated solids are separated from the waste water effluent before the next succeeding precipitating agent is added. Preferably two such successive precipitation steps are performed, after which the resultant waste water effluent is treated with an oxidizing and disinfecting agent, filtered, and then treated with a further oxidizing and disinfecting agent to minimize the B.O.D. level. In the course of the process, a portion of the solids separated from the waste water effluent in the respective steps is preferably recycled into the treatment system by mixing it with new incoming waste water to partially take the place of the original coagulant aid. The preferred coagulant aid utilized is portland cement, with aluminum sulfate and copper sulfate preferably being used in sequence as the precipitating agents and potassium permanganate and ozone being used in sequence as the oxidizing and disinfecting agents.

6 Claims, 2 Drawing Figures

CHEMICAL WASTE WATER TREATMENT METHOD

BACKGROUND OF THE INVENTION

This invention relates to the chemical treatment of domestic, commercial or industrial waste water to remove various solids and contaminants therefrom. More particularly, the invention involves a relatively high degree of contaminant removal from municipal sewage and other types of waste water having a high total solids content (at least 200 mg/l) so that the resultant effluent can be used immediately for commercial purposes or even rendered potable if desired.

Many chemical processes for the purification of impure or turbid water of the type ordinarily found in rivers and streams have been proposed in the past. Examples of such processes may be found in Keith, Jr. et al, U.S. Pat. No. 3,557,341, Sebald, U.S. Pat. No. 2,355,564, Farnham, U.S. Pat. No. 2,964,466, Kratz, U.S. Pat. No. 3,017,347 and Massatsch, U.S. Pat. No. 1,107,199. However such impure or turbid water is not comparable to "waste water" as the term is used herein, the latter having a total solids content normally exceeding that of the former by a factor of roughly 10, and having bacterial populations which are enormous compared to the bacterial population of mere impure or turbid water. Because of the very high solids and bacterial content of such waste water, techniques designed for mere water purification such as those shown in the foregoing patents are inadequate for treatment of waste water. This is primarily due to the fact that in water purification processes the precipitating agents are normally added at once, as shown for example in the Keith, Jr. et al or Sebald patents, rather than at different stations with solids removal steps interposed between successive additions of the precipitating agents. It has been found that the much larger mass, and greater ranges of sizes and complexity of waste water solids, when treated in such a manner, have a severe diluting effect on each of the precipitating agents by forcing their distribution among a large mass of solids for which they are not effective treatment agents, as well as among those solids for which they are effective. The effectiveness of each precipitating agent is thereby reduced, requiring a greater amount and higher cost of each agent to compensate for its reduced effectiveness. In addition the time required for sufficient solids removal is thereby unnecessarily prolonged. These disadvantages apply particularly in a system where settling, which is much less expensive than filtration, is utilized to remove the major solids.

Chemical systems have also been devised for the treatment of sewage or other types of waste water having relatively high total solids and bacterial content, as shown for example in Travers, U.S. Pat. No. 1,672,584, Brent et al, U.S. Pat. No. 3,687,646, Rice, U.S. Pat. No. 3,171,804, and Luck, U.S. Pat. No. 3,801,499. These however also suffer from the problem previously described with respect to the foregoing water purification systems, in that although multiple precipitating agents are added to the waste water they are also added substantially at once without the intervention of solids removal steps between successive additions. Thus the dilution of effectiveness and lack of economy with respect to the precipitating agents remains.

In addition, none of the prior processes suggests any means for insuring that the pH of the final treated effluent will automatically be in the desired neutral range without the costly addition of further chemicals whose only purpose is pH adjustment. This problem arises particularly in the chemical treatment of waste waters if the formation of nitrates is to be avoided during the treatment process, such nitrates being unduly expensive to remove once formed. To avoid the formation of such nitrates, it has been determined that the pH of the waste water must be raised to a relatively high level immediately at the beginning of the treatment process to kill nitrifying bacteria at the outset. The Luck, U.S. Pat. No. 3,801,499 does raise the pH of the waste water to over 11 to destroy pathogenic bacteria at the beginning of the treatment process, but does not show how to obtain a neutral final effluent (i.e. in the pH range of 6–8.5) without the addition of pH adjustment chemicals which have no other purpose in the process than to adjust the pH, thereby creating additional expense.

Finally, although the Sebald water purification process teaches the mixing of solids, precipitated from impure water, with further raw untreated water to provide more "complete mixing" prior to the entrance of the raw water into the treatment chamber, neither Sebald nor any other patents suggests the possibility of utilizing previously precipitated solids as replacements for treatment chemicals, particularly coagulant aids, whereby at the start of a process a normal amount of treatment chemical is used and then, after the process has progressed to the point where sufficient precipitated solids are produced, the precipitated solids are used to replace a portion of the original chemical in the treatment of further raw water, with the amount of the original treatment chemical required to achieve the same results being thereby reduced.

The foregoing deficiencies of the prior art have generally required such a high cost of chemicals for treatment of a given volume of waste water that such operations have not been commercially feasible. Accordingly there exists a great need for a chemical waste water treatment system which overcomes the lack of economy inherent in the previous systems while producing equal or better results.

SUMMARY OF THE PRESENT INVENTION

It is accordingly an object of the present invention to provide a chemical waste water treatment process which uses relatively small amounts of low cost chemicals but is nevertheless highly effective and reliable.

It is also an object of the present invention to provide such a chemical method of treating waste water which can produce potable water if desired.

It has been discovered that an extremely high quality effluent can be economically produced by treating waste water in accordance with the following basic sequence of steps:

a. mixing the raw waste water with an alkaline coagulant aid so that the resultant mixture will have a pH of at least about 9 but less than 11;

b. subjecting said mixture to at least two successive additions of an acidifying precipitating agent, so as to cause 1. the pH of the mixture to be lowered by about one pH unit for each addition;
2. suspended solids contained in the mixture to be collected into aggregates pursuant to each addition; and 3. the waste water effluent after all said additions to have a pH of 6.0–8.5 (i.e. neutral);

c. separating the aggregated solids from the waste water after each said addition;

d. thereafter adding to the neutral waste water effluent an amount of an oxidizing and disinfecting agent effective to oxidize at least a portion of the remaining solids in the effluent, especially organic dissolved solids, and convert them to a filterable state;

e. filtering the waste water effluent so as to separate such oxidized solids from the effluent; and f. adding to the filtered effluent a further oxidizing and disinfecting agent so as to minimize the B.O.D. level to below 20 mg/l, and preferably to 5 mg/l or less.

The foregoing basic process has several significant advantages over the above-described prior art processes. The effectiveness of the individual treatment chemicals employed is greatly improved by the process of successive additions of such chemicals with such solids separation steps interposed following each addition of a particular treatment chemical and prior to the next addition. The result is the ability to permit different respective treatment chemicals, which are most effective to remove different respective solids, to act on the respective solids without dilution of each chemical by other waste solids, thereby minimizing the amount of each chemical required for any given amount of waste water and minimizing the time required for solids removal.

In addition, the foregoing particular sequence of treatment steps provides for a high initial pH adjustment step followed by successive multiple solids precipitation steps utilizing precipitating agents which, besides removing the solids, also successively decrease the pH in increments to the neutral range. This insures that, after solids removal has been completed, the final effluent will automatically be in the desired neutral range with substantially no further pH adjustment being required by the addition of further chemicals having no other useful purpose.

A further important aspect of the invention from an economic standpoint is that a portion of the separated solids which are removed from the waste water can be used as a substitute for one or more of the treatment chemicals, particularly for a portion of the coagulant aid, by adding such solids together with a reduced amount of the chemical to a new portion of untreated waste water, the remainder of the solids being discharged from the system. By using these solids in this way, a substantial amount of the coagulant aid otherwise needed can be eliminated and the cost of the process thereby further greatly reduced.

It is also important to note that the foregoing multiple features of the present process, which have the effect of reducing the amount and thereby the cost of treatment chemicals required, also have the beneficial effect of reducing the volume of sludges produced by the process that must be dewatered and ultimately disposed of, since such sludges not only include the separated waste solids but also the treatment chemicals used.

The foregoing and other objectives, features and advantages of the present invention will be more readily understood upon consideration of the following detailed description of the invention taken in conjunction with the following drawings.

DESCRIPTION OF THE PREFERRED EMBODIMENT

Figure 1:
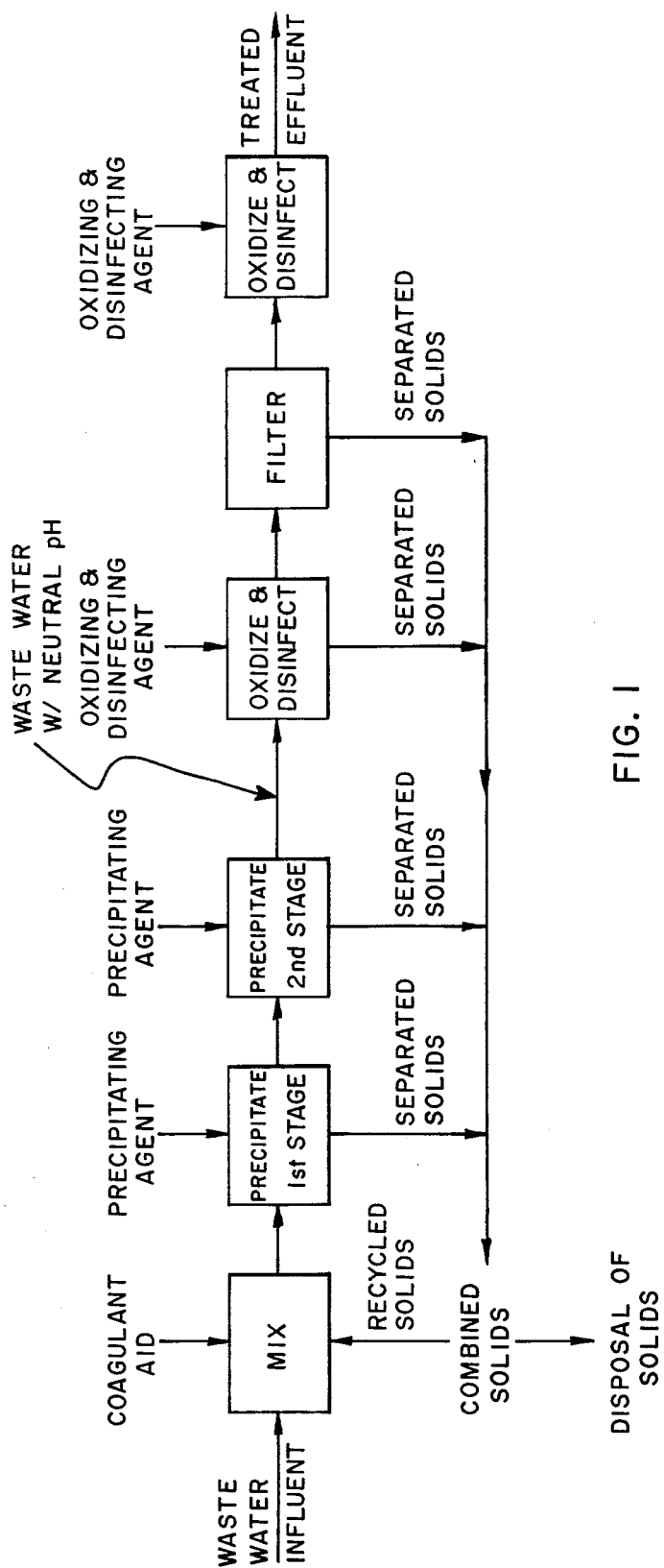
FIG. 1 is a flow chart showing the steps of treating waste water and recycling separated solids according to the preferred embodiment of the present invention.

The waste water which can be treated by the present invention can be virtually any waste water stream having a pH of below 9. This would include almost any type of industrial commercial process, municipal or agricultural waste water since there are very few processes which produce waste water with a pH above 8. Examples include ordinary domestic sewage; cannery, food processing or meat packing waste water; waterborne poultry or other animal wastes, etc. The waste water may contain suspended, colloidal and dissolved solid particles in widely varying concentrations without adversely affecting the treatment capability of the process. As used herein, "suspended solids" include gross and settleable solids as well as more finely divided solids having a particle size down to about one-tenth micron. No temperature control whatsoever is required inasmuch as this parameter is not critical to the operation of the system. It is necessary only that the waste water be maintained in its liquid state, i.e. above freezing. Otherwise climactic temperatures are satisfactory.

The first step of the process is mixing the waste water influent with a coagulant aid. A coagulant aid is a material which is capable of accelerating the rate of floc formation, and causing the floc to be larger, denser and/or stronger. The preferred coagulant aid for the present invention is portland cement, although lime, sodium silicate, diatomaceous earth and other such known materials, or mixtures thereof, which tie onto the waste solids and aid the coagulation and subsequent precipitation processes could be used. Other functions of this step include killing the nitrifying bacteria present in the waste water, softening of the water, and phosphate removal. These functions are due principally to the high pH adjustment of the step.

For waste water having a pH of 8.0 or below to be treated by the present invention, the coagulant aid should be sufficiently alkaline and should be added in sufficient amount to raise the pH of the waste water stream to a pH value of at least about 9.0 and preferably 9.5–10.5. For phosphate removal, the pH must be adjusted at least to about 10. A pH adjustment to as high as 11 is unnecessary to accomplish the foregoing functions and should be avoided since the amount of subsequent chemicals necessary to bring the pH down to the neutral range (6–8.5) will be too great and thus unnecessarily costly. With low pH waste waters, the final pH after mixing is the sole criteria for determining the amount of coagulant aid added. Portland cement is particularly effective here because it has a relatively high pH (approximately 12.5).

With waste water influent streams having a pH above 8.0, the final pH after mixing is not the sole criteria as to the amount of coagulant aid. In any event, the pH of the resultant mixture should be in the range 9.0–10.5 as above, but the minimum amount of coagulant aid should also be enough to be effective in accelerating the rate of floc flormation. For example, if a waste water having a pH of 8.7 is to be treated by the present invention, very little coagulant aid is needed to adjust the pH to within the range of 9.0–10.5 since the waste water is already nearly within that range. However a minimum amount of coagulant aid is needed to accelerate the formation of floc; otherwise the following precipitating steps will take an unduly long time and will not be as effective. The minimum effective amounts of the various conventional coagulant aids are well known to those skilled in the art and are not part of this invention. For portland cement the effective amount is in the range of about 2,000 to about 4,000 pounds per million gallons of influent. However, if sludge recycling is used the amount will be substantially less according to the proportion of the sludges which are recycled, as explained hereafter. It should be noted that for high pH waste water streams, it may be undesirable to use a highly alkaline coagulant aid such as portland cement because effective amounts of such coagulant aid may raise the pH above the 9.0–10.5 range. In such cases a less alkaline coagulant aid such as diatomaceous earth is particularly effective.

The mixing associated with the addition of the coagulant aid can occur in any type of conventional mixing apparatus. It is preferred that the mixture be stirred slowly at a velocity sufficiently high to accelerate the growth of floc particles by frequent collisions and prevent settling of the floc, but not high enough to rupture the floc. The temperature of this step, like the rest of the process, is not critical. The time of mixing is preferably at least 5 minutes in order to obtain sufficient floc formation, but there is no maximum time limitation. The most preferred time range is 10 to 20 minutes.

The next operation involves treating the waste water with precipitating agents so as to lower the pH of the waste water sequentially; that is, each addition of a precipitating agent lowers the pH of the waste water mixture about one pH unit (e.g. from 9 to 8). "About 1 pH unit" as used herein can mean from 0.75 to 1.5 pH unit. For the present invention, a precipitating agent is defined as being a chemical agent capable of collecting at least suspended material into loose aggregates sufficiently large to be settleable in a settling chamber or removable by a filter. These agents primarily include acidic coagulants which may or may not have other functions as, for example, algae control agents, disinfectants, oxidants, etc. Among the strong coagulants it is preferred to use salts of aluminum and ferric iron, although other coagulants such as copper sulfate, sulfuric acid, hydrochloric acid, etc. can also be used. After each addition of a precipitating agent the aggregated solids are separated from the effluent before the next addition, preferably by settling. The principal results of these steps are the almost complete removal of suspended solids from the waste water and the reduction of the pH of the waste water to a neutral pH. By "neutral pH" it is meant that the pH of the resultant waste water effluent is between 6.0 and 8.5, preferably in the range 6.5–7.5.

The sequence in which specific precipitating agents are employed is not critical to the present invention, and the same precipitating agent can be used in successive precipitating procedures if necessary. However, it is preferred that a strong coagulant such as aluminum sulfate be the first precipitating agent. The reasons for this are, first, strong coagulants are more effective agents for removing the heavier suspended particles than other agents. Second, strong coagulants work more effectively with coagulant aid materials than do the other possible types of precipitating agents. If a strong coagulant is used as the first precipitating agent, it is also preferred that the second (and third, if desired) agents not necessarily be strong coagulants but rather include other properties such as disinfecting and oxidizing qualities. This is because ythey necessarily will have to act on lighter solid particles which were not effectively precipitated by the strong coagulant, such remaining particles comprising primarily lighter suspended, colloidal and some larger dissolved solids. Therefore the latter precipitating agents should be principally selected for treating these types of solids. In the most preferred sequence of precipitating agents, aluminum sulfate (a strong coagulant especially effective when used with portland cement), and copper sulfate (a weaker coagulant but strong oxidizing, disinfecting and algae control agent) are used in that order.

In the first precipitation step, the precipitating agent is added to the mixture of waste water and coagulant aid, and slowly stirred therewith for a further period of about ten minutes to enhance floc formation by encouraging particle collisions without rupturing the floc. The precipitating agent should be employed in an amount sufficient to lower the pH of the mixture by about one pH unit. Thereafter the mixture is preferably transferred to a settling tank or flocculating chamber where the holding time should be at least thirty minutes and preferably one to two hours so as to allow the floc solids to settle on the bottom of the apparatus. As a result of this step, the heavier suspended solids and some lighter solids are separated from the effluent.

Thereafter, the partly cleaned waste water is removed from the settled solids. Normally this is accomplished by slowly removing the waste water at the top of the apparatus without disturbing the settled solids. The waste water is then treated with the next successive precipitating agent in an amount sufficient to lower the pH of the waste water by about one more unit. Settling in a clarifier for one to two hours, or alternatively filtering, follows. If desired the operation can be repeated a third time, although this would normally not be necessary. The second precipitating procedure removes the lighter suspended solids and some of the colloidal and dissolved solids from the waste water. After the last precipitation step the pH of the water should have been reduced to the neutral range between 6 and 8.5.

The neutral effluent is separated from the settled solids in the clarifier, again preferably by removing the effluent at the top of the clarifier, and transferred to a further chamber where an oxidizing and disinfecting agent is added to the waste water for the purpose of aiding the removal of any remaining suspended solids and some colloidal and dissolved solids, particularly organic solids. Here the minimum holding time should be 30 minutes to 1 hour. The preferred oxidizing and disinfecting agent is potassium permanganate since, when it oxidizes dissolved organic material in water, it turns the water color to brown. Subsequently, such color change makes it easier to determine if any such oxidized solids are left in the water at the end of the process. Potassium permanganate also is a strong disinfectant helping to kill bacteria and has the further capability of removing iron and manganese from the water. A number of well-known alternative oxidizing agents exist which could be used in the process such as chlorine, chlorine dioxide, sodium chlorite, etc. However their use would result in the presence of chloramines in the effluent, which is undesirable. Comparatively little precipitation occurs in this chamber, although some provision for removing sediment should be provided. Rather the primary purpose of this step is to render the remaining suspended, and some colloidal and some dissolved solids (primarily organics) filterable. The amount of such oxidizing and disinfecting agent will not effect the pH of the effluent to a great extent because it is used in a relatively small amount, made possible by the substantial removal of suspended solids in the preceding precipitation steps. The amount of such agent will vary depending upon the purity desired for the final effluent. Such effluent purity can be measured by conventional analysis and compared with a predetermined standard to determine whether a sufficient amount of the agent is being used.

After the water has been treated with the oxidizing and disinfecting agent, it is passed through a conventional sand filter to remove substantially all of the oxidized solids and any remaining other suspended solids. The sand filter used may employ relatively fine sand (preferably 60 micron size) without impairing its efficiency because of the effective removal of the suspended solids in the previous precipitation steps. The amount of solid material removed by the filtering step is quite small so that the filter does not require frequent cleaning. Any comparable filter apparatus to conventional use in the treatment of water or waste water can alternatively be used, although it is preferred to use sand filters because of their relatively low cost and long durability.

The filtered water which, as a result of the previous steps should have a suspended solids content of no more than 10 mg/l and preferably no detectable suspended solids if a potable effluent is desired, is then treated with at least one further oxidizing and disinfecting agent to kill any remaining bacteria and lower the B.O.D. of the water. THe quality of the final water discharge from the system will depend on to what degree it is disinfected. If it is desired to have absolutely potable water, the degree of disinfection will be greater than where the objective is simply to have an extremely clear and commercially reusable but not quite potable water. The preferred means of disinfection is ozonation because of its efficiency in a system of this type where no more than 10 mg/l of suspended solids remain. However treatment with oxygen, chlorine, the hypochlorites of sodium or calcium, or other similar disinfecting means or combinations thereof, although not as desirable, could alternatively be employed particularly if the remaining suspended solids content were greater. If ozonation is used, the degree of disinfection will be proportional to the amount of ozone added, the degree of agitation after addition of the ozone, and the duration of the exposure of the effluent to the ozone. Variation of any one factor will correspondingly vary the requirement for the other factors. In any case, the degree of disinfection should be such as to lower the B.O.D. of the effluent to below 20 mg/l, and preferably to 5 mg/l or less for potable water.

If a potable effluent is desired, the foregoing disinfecting step is followed by treatment with activated carbon for odor and taste removal by adsorption. Because of the high purity of the effluent at this point, retaining no significant amount of suspended solids, the necessity for frequent regeneration of the activated carbon will be minimized. More importantly, however, the high oxygen content of the effluent due to the preceding ozonation step helps to regenerate the activated carbon while treatment is in process by preventing plugging or contamination of the activated carbon, thereby making the particular combination of ozonation followed by activated carbon treatment highly desirable and advantageous.

The solids separated from the effluent in the precipitation steps and subsequent filtration step are removed periodically by draining them from the bottoms of the precipitation apparatus and by backwashing of the filters. It is desirable that they be removed without substantially disturbing the body of waste water in the apparatus and thus interfering with the precipitation or filtering processes. It is also desirable that they be removed in a way so as not to require stoppage of a continuous treatment process. Normally the solids can be removed slowly through the bottom of the precipitation apparatus without disturbing the waste water. These removed settled solids are in the form of sludges with about 2.5% by weight solids content.

The sludges can be totally disposed of by conventional methods. preferably however part of the sludges, especially those resulting from the first precipitation step but optionally also including those resulting from one or more of the other steps, are recycled back to the mixing tank where the coagulant aid is added. The recycled sludge is rich in coagulant aid and may therefore be used to replace between 10% and 60% of the coagulant aid used in that step. The pH of the recycled sludges will be about 10.0 before they are added to the mixing tank because the amount of precipitating and oxidizing chemicals is much less than the amount of coagulant aid.

It should be understood that the recycling of the sludge as a replacement for the pure coagulant aid is a basic economy measure applicable in any waste water treatment process where a coagulant aid is employed, regardless of the number of precipitation, solids separation, or other steps utilized. Accordingly this invention is intended to include within its scope the use of the recycling of such sludge as a replacement for coagulant aid in any waste water treatment process.

Referring to FIG. 1, a flow chart is shown which illustrates the steps of treating waste water and recycling the separated solids in accordance with the preferred embodiment of the present invention.

Figure 2:
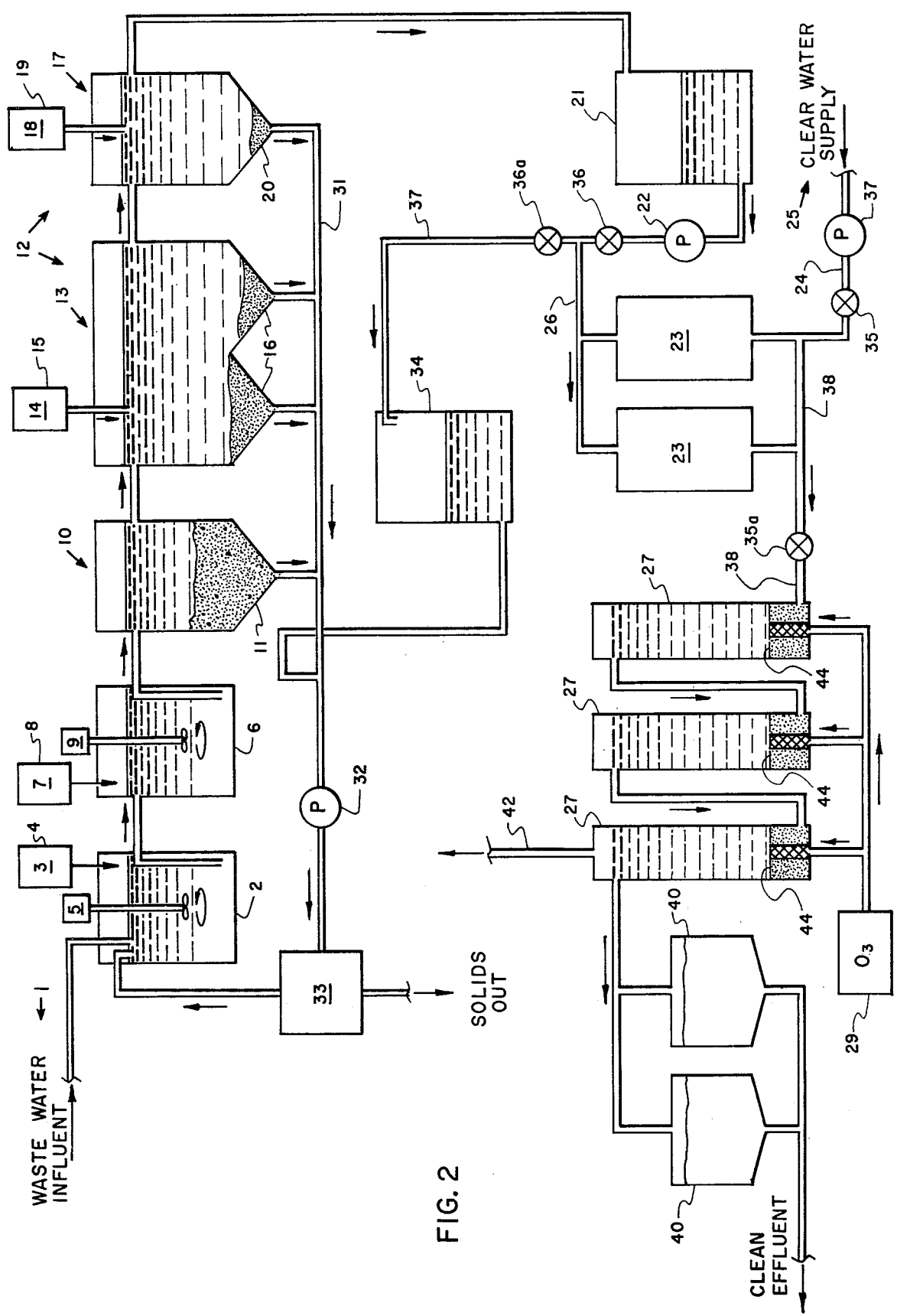
FIG. 2 is a diagrammatic layout of an exemplary waste water treatment plant designed to utilize the process of the preferred embodiment.

Referring to FIG. 2, an exemplary water treatment installation is shown which details a preferred way of carrying out the present invention. Waste water influent 1 is flowed into a mixture chamber 2. Portland cement 3, which is the coagulant aid, is added to the mixing chamber by a dry chemical dispenser 4. A stirrer 5 is used to keep the mixture in constant motion and prevent the portland cement and solid material in the waste water from settling to the bottom of the chamber. The mixture is then transferred into a second mixing chamber 6. At the point where the waste water enters the chamber 6, aluminum sulfate 7 is added through a dry chemical dispenser 8. A stirrer 9 encourages floc growth and prevents the mixed solids from settling. The waste water mixture is then transferred to a floculating or settling chamber 10 and detained there long enough so that substantially all of the heavier suspended solid particles are allowed to settle on the tapered bottom of the floculating chamber 11. The waste water is then transferred to the first stage 13 of a two stage clarifier 12. At the point where the waste water enters this first stage, copper sulfate 14 is added to the waste water stream by means of a liquid chemical dispenser 15. The waste water is detained in this first stage long enough to permit precipitation of lighter suspended solids which settle in the tapered bottom portions 16 of this stage of the clarifier. The waste water is then transferred to the second stage of the clarifier 17. At the point where the waste water enters the second stage potassium permanganate 18 is added to the waste water stream by a liquid chemical dispenser 19. The waste water is detained in this second stage long enough for the water to turn a dark brown color, indicating oxidation of solids. Some solids settle out at the bottom of the second stage 20.

The waste water is thereafter transferred to a variable surge tank 21 where it can be held when the sand filters 23 are not operating or are being backwashed. If the sand filters are operating, the waste water will travel straight through the surge tank 21 and pump 22 and through pipes 26 into the filters 23. Periodically it becomes necessary to backwash the filters to remove the solids deposited therein. This is accomplished by pumping clear water through pipe 24, either from the clear final effluent of the process or from some other supply means 25, through a pump 37 and upwardly through the set of sand filters in the opposite direction to that in which the waste water normally flows. The conducting or non-conducting conditions of valves 35, 35A, 36 and 36A are changed accordingly when the filters are converted from treatment mode to backwash mode and vice versa. During the treatment mode valves 36 and 35A are open while valves 36A and 35 are closed. During the backwash mode each valve is in its opposite condition. The backwash water containing the filtered solids is removed by pipe 37 to a backwash surge tank 34 wherefrom it can be disposed of or combined with the other settled solids to be recycled or disposed of.

After the effluent has been filtered through the sand filters it travels through pipe 38 to a series of upright ozonation tubes 27. The effluent enters the bottom of one tube, travels to the top, and then is conducted serially to the bottom of the next tube and so forth. Ozone is supplied by an ozonator 29 under pressure to the bottom of each tube where it mixes with great agitation with the effluent and then remains in contact with the effluent throughout the length of the respective tube. The agitation and resultant ozone mixing is enhanced by providing a layer of garnet 44, about a foot high, above the level of effluent entry adjacent the ozone inlets. An exhaust pipe 42 conducts away excess ozone from the top of the final tube 27 and thereby relieves the pressure exerted by the ozone on the effluent at the point of exit from the ozonation tubes.

After the effluent is treated with ozone it is optionally passed through a series of activated carbon filters 40. The water effluent then exits the system. The precipitated and filtered solids are collected by a pipe 31 and transfered in sludge form by a pump 32 to a proportioning valve 33 wherefrom a portion of the sludge is recycled back to the mixing tank 2 and the remainder is disposed of.

In order that those skilled in the art may better understand how the present invention can be effectuated, the following examples are given by way of illustration and not by way of limitation.

EXAMPLE 1

In a continuous operation of the present invention the following procedure occurs:
  a. Domestic waste water, i.e. municipal sewage, is fed into a treatment plant using the process of the present invention at a rate of 1 million gallons per day. The waste water has a pH of 6.6 and contains about 6000 lbs. of total solids per million gallons of waste water, of which about 2075 lbs. are suspended and the remainder are colloidal and dissolved. The waste water is mixed in a mixing chamber with portland cement. The rate of feed for the portland cement is 3320 lbs. per million gallons of waste water until recycling of a portion of the sludge to the mixing chamber begins, at which time the feed rate of portland cement diminishes as described hereafter. The average holding time for the waste water in the chamber is about 10 minutes, during which it is mechanically stirred. The pH of the mixture when it leaves the chamber is 10.2.
  b. The mixture is transferred to a second mixing chamber where aluminum sulfate in the hydrate form $Al_2(SO_4)_3 \cdot 14H_2O$, known as "alum," is added at the rate of 830 lbs. per million gallons of waste water. The mixture is further stirred and held in the chamber for an average time of about 10 minutes. When it leaves the chamber the effluent has a pH of about 8.8;
  c. Thereafter the mixture is transferred to a floculating chamber where the average holding time is about 1 hour. During this time the heavier suspended solids contained in the waste water, portland cement and $Al_2(SO_4)_3$ settle to the bottom of the chamber. The waste water effluent is removed from the top of the chamber without disturbing the precipitation process.
  d. The partly cleaned waste water effluent is then transferred to a clarifier. Here it is mixed with cupric sulfate in the hydrate form $CuSO_4 \cdot 5H_2O$, known as "bluestone," which is added to the clarifier at a rate of 415 lbs. per million gallons of waste water. The mixture is held in the clarifier for an average holding time of about 2 hours. During this time, solids in the mixture settle to the bottom of the clarifier. The waste water effluent is removed from the top of the clarifier without disturbing the precipitation process. The pH of the effluent when leaving the clarifier is about 7.4.
  e. The neutral waste water effluent is then transferred to another clarifier. Here it is mixed with potassium permanganate, which is added at a rate of 83 lbs. per million gallons of waste water. The mixture has an average holding time of one hour in the clarifier. During this time, solids in the mixture are allowed to settle to the bottom of the clarifier. The effluent is removed from the top of the clarifier without disturbing the settling process.
  f. The effluent is then transferred to a 60 micron size sand filter which removes the oxidized solids contained in the effluent.
  g. The filtered effluent is transferred to three ozonation chambers in series where ozone is bubbled at 10 psi through the water and violently mixed therewith at a rate of 5,500 grams of ozone per million gallons of effluent. This has the effect of disinfecting the waste water of any bacteria and microorganisms contained therein. The effluent has an average holding time of 5 minutes for each stage of the three-stage ozonator.
  h. After the ozone treatment, the effluent is ready to be reused; if potable water is desired, further treatment with activated carbon is performed.

i. The settled solids of steps (c), (d) and (e), in sludge form containing about 2-5% solids on a dry weight basis, are periodically drained from the respective flocculating and clarifier chambers without disturbing the flow of the effluent or the precipitation process. The solids collected in the sand filters in step (f) are likewise removed from the filters by backwashing. All of the settled and filtered solids combined together yield a dry weight total of approximately 6720 lbs. per million gallons of waste water treated. The pH of the sludges containing such solids is about 10.

j. Once the combined precipitated and filtered soilds have been generated in sufficient amounts to permit recycling, a proportion of the sludge is recycled back into step (a) as a substitute for some of the portland cement. Assuming that the waste water influent continuously has the same characteristics, the amount of portland cement required to produce a pH of about 10 is only 1660 lbs. per million gallons of influent instead of 3320 lbs. per million gallons. The other 1660 lbs. of portland cement per million gallons, used originally in the process, is replaced by about 5000 lbs. of recycled solids per million gallons of influent. The amounts of the other chemicals added in the process remain the same. Once recycling is in full operation, the combined settled and filtered solids yield a dry solids content of about 10,000 lbs. per million gallons of waste water, but half of this is continually recycled back into step (a) as a substitute for half of the portland cement originally required. The remainder of the sludges are dewatered and disposed of, preferably as fertilizer where their high lime, potassium and phosphate content make them substantially more valuable than biological sludges. The recycling step greatly reduces the amount of portland cement needed for the continuation of the process and thus reduces the cost of the operation of the system, while reducing the amount of sludge which must be disposed of.

EXAMPLE 2

Water-borne poultry waste having a total solids content of about 3000 lbs. per million gallons was treated with the same chemicals as used in Example 1 and in substantially the same manner and proportions, but with no activated carbon treatment. The influent and effluent were analyzed with the following results:

|  | Influent (mg/l) | Effluent (mg/l) |
|---|---|---|
| Total Solids | 365 | 272 |
| Total Dissolved Solids | 272 | 268 |
| Total Suspended Solids | 93 | 4 |
| Total Volatile Solids | 218 | 147 |
| Total Volatile Dissolved Solids | 216 | 146 |
| Total Volatile Suspended Solids | 1 | 2 |
| B.O.D. | 1,000 | 15 |
| C.O.D. | 229.0 | 12.7 |
| Total Phosphate | 12.0 | 0.42 |
| Ammonia Nitrogen | 13.8 | 7.5 |
| Organic Nitrogen | 15.5 | 1.2 |
| Total Nitrogen | 29.3 | 8.7 |
| Color | 68.3* | 8.5* |
| Turbidity | 120** | 2.4* |
| Calcium | 2.8 | 26.0 |
| Copper | 0.04 | 0.4 |
| Iron | 0.1 | *** |
| Magnesium | 2.7 | 2.6 |
| Manganese | 0.04 | 0.8 |
| Sodium | 35.0 | 19.0 |
| Potassium | 25.0 | 5.0 |
| Zinc | 0.17 | 1.3 |

*Color Units
**Jackson Turbidity Units
***None Detected

The comparison shows that over 95% of the suspended solids present in the influent were removed. A small net decrease in the weight of dissolved solids occurred, but the effect was more substantial than indicated merely by the net decrease since the quantities of certain specific dissolved solids decreased markedly and the B.O.D. and C.O.D. dropped sharply, making the effluent close to acceptable for potable community water systems.

The examples, terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of treating waste water, having a pH below 9.0 and containing nitrifying bacteria and in excess of 200 mg/l total solids, selected from the group consisting essentially of municipal sewage and industrial, commercial and agricultural process waters containing organic wastes and mixtures thereof, said method comprising the following sequential steps:

a. mixing an amount of said waste water with an amount of an alkaline coagulant aid effective to obtain a mixture having a pH of at least about 9 but less than 11 and thereby killing said nitrifying bacteria by means of said rise in pH level, said coagulant aid being selected from the group consisting essentially of portland cement, lime, sodium silicate and mixtures thereof;

b. adding to said mixture an acidifying precipitating agent, selected from the group consisting essentially of salts of aluminum, salts of ferric iron, copper sulfate, sulfuric acid and hydrochloric acid, and mixtures thereof, in an amount effective to lower the pH of the mixture by about 1 pH unit and thereby causing suspended solids contained in the mixture to be collected into aggregates;

c. separating said aggregated solids from said mixture;

d. adding to the resultant mixture, remaining after the separation of said aggregated solids, an acidifying precipitating agent selected from said group of precipitating agents in an amount effecting to further lower the pH of the mixture by about 1 pH unit to a pH no lower than about 6 and no higher than about 8.5, and thereby causing suspended solids contained in the mixture to be collected into further aggregates;

e. separating said further aggregated solids from the mixture;

f. adding to the resultant mixture, remaining after said multiple separations of aggregated solids, an amount of an oxidizing and disinfecting agent effective to oxidize at least a portion of the remaining solids in the mixture and convert them to a filterable state;

g. filtering the mixture so as to separate said oxidized solids from the mixture; and h. adding to the filtered mixtured an amount of a second oxidizing and disinfecting agent effective to lower the B.O.D. level of the mixture to below 20 mg/l.

2. The process of claim 1 wherein the treatment of step (h) includes adding an amount of said second oxidizing and disinfecting agent effective to loqwer said B.O.D. level to 5 mg/l or less.

3. The process of claim 2 including the further step of flowing the mixture resulting from the treatment of step (h) through activated carbon.

4. The process of claim 1, further including:

i. mixing a second amount of said waste water, equal to said first amount of waste water, with a lesser amount of said coagulant aid than was mixed with said first amount of waste water in step (a), and adding to said second amount of waste water an amount of said aggregated solids separated in step (c) effective to obtain a second mixture having a pH substantially the same as that of said first mixture obtained in said step (a); and j. repeating said steps (b) through (h) with respect to said second mixture.

5. A method of treating waste water, having a pH below 9.0 and containing nitrifying bacteria and in excess of 200 mg/l total solids, selected from the group consisting essentially of municipal sewage and industrial, commercial and agricultural process waters containing organic wastes and mixtures thereof, said method comprising the following sequential steps:

a. mixing said waste water with an amount of portland cement effective to obtain a mixture having a pH of at least about 9 but less than 11 and thereby killing said nitrifying bacteria by means of said rise in pH level;

b. subjecting said mixture to at least two successive additions of acidifying precipitating agents selected from the group consisting essentially of alum and copper sulfate in amounts effective to cause:
  1. the pH of the mixture to be lowered by about 1 pH unit for each addition;
  2. suspended solids contained in the mixture to be collected into aggregates pursuant to each addition; and
  3. the mixture after all said additions to have a pH no lower than about 6 and no higher than about 8.5;

c. separating said aggregated solids from said mixture between said first and second additions, and again after said second addition;

d. adding to the resultant mixture, remaining after said multiple separations of aggregated solids, an amount of potassium permanganate effective to oxidize at least a portion of the remaining solids in the mixture and convert them to a filterable state;

e. filtering the mixture so as to separate said oxidized solids from the mixture; and f. adding to the filtered mixture an amount of ozone gas effective to lower the B.O.D. level of the mixture to below 20 mg/l.

6. A method of treating waste water, initially having a pH below 9.0 and containing nitrifying bacteria and in excess of 200 mg/l total solids, selected from the group consisting essentially of municipal sewage and industrial, commercial and agricultural process waters containing organic wastes and mixtures thereof, said method comprising the following seguential steps:

a. mixing a first portion of said waste water with an amount of an alkaline coagulant aid effective to obtain a first mixture having a pH of at least about 9 but less than 11 and thereby killing said nitrifying bacteria by means of said rise in pH level, said coagulant aid being selected from the group consisting essentially of portland cement, lime, sodium silicate and mixtures thereof;

b. adding to said waste water an acidifying precipitating agent selected from the group consisting essentially of salts of aluminum and ferric iron, copper sulfate, sulfuric acid and hydrochloric acid, and mixtures thereof, in an amount effective to collect suspended solids contained in the waste water into aggregates;

c. separating said aggregated solids from said mixture;

d. adding to the resultant mixture, remaining after the separation of said aggregated solids, an oxidizing and disinfecting agent in an amount effective to oxidize at least a portion of the solids therein;

e. separating said oxidized solids from said waste water and combining said aggregated solids and oxidized solids together;

f. mixing a second portion of said waste water, equal in amount to said first portion, with a lesser amount of said coagulant aid than was mixed with said first portion in step (a), and adding to said second portion of said waste water an amount of said combined aggregated solids and oxidized solids effective to obtain a second mixture having a pH substantially the same as that of said first mixture obtained in said step (a); and g. repeating said steps (b) through (e) with respect to said second portion of waste water.

* * * * *

UNITED STATES PATENT AND TRADEMARK OFFICE
CERTIFICATE OF CORRECTION

PATENT NO. : 4,049,545
DATED : September 20, 1977
INVENTOR(S) : Peter J. Horvath It is certified that error appears in the above–identified patent and that said Letters Patent are hereby corrected as shown below:

Col. 6, line 8 Change "ythey" to --they--;

line 27 Change "flocculating" to --floculating--.

Col. 7, line 38 Change "THe" to --The--.

Col. 8, line 21 Change "preferably" to --Preferably--.

Col. 13, line 9 Change "loqwer" to --lower--.

Col. 14, line 17 Change "seguential" to --sequential--.

Signed and Sealed this

Thirtieth Day of May 1978

[SEAL]

Attest:

RUTH C. MASON
Attesting Officer

LUTRELLE F. PARKER
Acting Commissioner of Patents and Trademarks